US009843251B2

(12) United States Patent
Hong et al.

(10) Patent No.: US 9,843,251 B2
(45) Date of Patent: Dec. 12, 2017

(54) RECTIFIER AND METHOD OF CONTROLLING THE SAME

(71) Applicants: Samsung Electro-Mechanics Co., Ltd., Suwon-si (KR); University of Seoul Industry Cooperation Foundation, Seoul (KR)

(72) Inventors: Byung Joo Hong, Suwon-si (KR); Jong Woo Lee, Suwon-si (KR); Hyung Gu Park, Seoul (KR); Young Jun Park, Suwon-si (KR); Seong Jin Oh, Suwon-si (KR); Kang Yoon Lee, Seoul (KR); Joong Ho Choi, Seongnam-si (KR); Hong Jin Kim, Seoul (KR); Je Hyuk Ryu, Suwon-si (KR); Jung Yeon Kim, Suwon-si (KR)

(73) Assignees: Samsung Electro-Mechanics Co., Ltd., Suwon-si (KR); University of Seoul Industry Cooperation Foundation, Seoul (KR)

( * ) Notice: Subject to any disclaimer, the term of this patent is extended or adjusted under 35 U.S.C. 154(b) by 0 days.

(21) Appl. No.: 15/179,227

(22) Filed: Jun. 10, 2016

(65) Prior Publication Data
US 2016/0373023 A1 Dec. 22, 2016

(30) Foreign Application Priority Data

Jun. 17, 2015 (KR) .......................... 10-2015-0086133
Nov. 17, 2015 (KR) .......................... 10-2015-0161059

(51) Int. Cl.
H02M 3/335 (2006.01)
H02M 1/08 (2006.01)
H02M 7/219 (2006.01)
H02M 1/00 (2006.01)

(52) U.S. Cl.
CPC ............. *H02M 1/08* (2013.01); *H02M 7/219* (2013.01); *H02M 2001/0009* (2013.01); *H02M 2007/2195* (2013.01); *Y02B 70/1408* (2013.01)

(58) Field of Classification Search
CPC ..... H02M 1/42; H02M 7/219; Y02B 70/1408; H02J 7/0072
USPC .... 363/37, 41, 71, 77, 81, 84, 89, 126, 127, 363/16
See application file for complete search history.

(56) References Cited

U.S. PATENT DOCUMENTS 6,618,274 B2 * 9/2003 Boylan ............. H02M 3/33592 363/17
7,269,038 B2 * 9/2007 Shekhawat ............. H02M 1/42 363/71
7,746,671 B2 * 6/2010 Radecker .......... H02M 3/33507 323/244

(Continued)

FOREIGN PATENT DOCUMENTS

JP 2003-244941 A 8/2003
KR 10-2005-0118423 A 12/2005

*Primary Examiner* — Rajnikant Patel
(74) *Attorney, Agent, or Firm* — NSIP Law

(57) ABSTRACT

A rectifier includes: a rectifying circuit configured to rectify alternating current (AC) power into direct current (DC) power through a switching operation; a driver configured to apply a switching signal to the rectifying circuit; and a signal modulator configured to select a parameter from among parameters of the switching signal based on a frequency of the switching signal, and adjust the selected parameter.

17 Claims, 7 Drawing Sheets

(56) References Cited

U.S. PATENT DOCUMENTS

| | | | |
|---|---|---|---|
| 8,773,077 B1 * | 7/2014 | Elmes | H02J 7/0072 |
| | | | 320/128 |
| 9,088,222 B2 * | 7/2015 | Irish | H02M 1/4266 |
| 9,362,835 B2 * | 6/2016 | Xu | H02M 3/33569 |
| 9,548,666 B2 * | 1/2017 | Block | H02M 1/44 |
| 2005/0276079 A1 | 12/2005 | Park et al. | |

* cited by examiner

RECTIFIER AND METHOD OF CONTROLLING THE SAME

CROSS-REFERENCE TO RELATED APPLICATIONS

This application claims the benefit of Korean Patent Application Nos. 10-2015-0086133 and 10-2015-0161059 filed on Jun. 17, 2015 and Nov. 17, 2015, respectively, in the Korean Intellectual Property Office, the entire disclosures of which are incorporated herein by reference for all purposes.

BACKGROUND

1. Field

The following description relates to a rectifier and a method of controlling the same.

2. Description of Related Art

Generally, a rectifier is an apparatus that rectifies alternating current (AC) power into direct current (DC) power. For example, a rectifier may output DC power through a plurality of switching elements of which turn-on and turn-off functions are controlled by a level of the AC power. It is desirable to provide a rectifier and a method of controlling a rectifier having improved rectification efficiency.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a rectifier includes: a rectifying circuit configured to rectify alternating current (AC) power into direct current (DC) power through a switching operation; a driver configured to apply a switching signal to the rectifying circuit; and a signal modulator configured to select a parameter from among parameters of the switching signal based on a frequency of the switching signal, and adjust the selected parameter.

In response to the frequency of the switching signal being higher than a first reference frequency, the selected parameter may include a phase of the switching signal. In response to the frequency of the switching signal being lower than the first reference frequency, the selected parameter may include a duty ratio of the switching signal.

In response to the frequency of the switching signal being higher than the first reference frequency and lower than a second reference frequency, the selected parameter may include the phase of the switching signal and the duty ratio of the switching signal.

The rectifier may further include: a sensor configured to sense a current flowing through the rectifying circuit, wherein the signal modulator is further configured to adjust at least one of a phase or a duty ratio of the switching signal based on the current flowing through the rectifying circuit.

The signal modulator may include: a phase adjuster configured to adjust the phase of the switching signal; a duty ratio adjuster configured to adjust the duty ratio of the switching signal based on a sensing result of the sensor; and switches configured to perform a branch operation based on a frequency of the switching signal between the sensor, the phase adjuster, and the duty ratio adjuster.

The phase adjuster may be configured to compare a phase of the AC power and the phase of the switching signal to each other, and adjust the phase of the switching signal, based on a result of the comparison, to synchronize the AC power and the switching signal with each other.

The rectifying circuit may include: first and second transistors configured to receive the AC power through drain terminals of the first and second transistors, and receive the switching signal through gate terminals of the first and second transistors; and third and fourth transistors configured to receive the AC power through source terminals of the third and fourth transistors, and receive the switching signal through gate terminals of the third and fourth transistors. The first transistor may be connected to the third transistor in series. The second transistor may be connected to the fourth transistor in series.

The rectifier may further include: a sensor configured to sense a reverse current flowing through the first and second transistors, wherein the signal modulator is configured to control a fall point in time of the switching signal applied to the first and second transistors based on the reverse current.

In another general aspect, a method of controlling a rectifier includes: applying a switching signal to the rectifier; selecting a parameter from among parameters of the switching signal based on a frequency of the switching signal; and adjusting the selected parameter with respect to the switching signal.

The adjusting of the selected parameter may include one of: adjusting a phase of the switching signal in response to the frequency of the switching signal being higher than a first reference frequency; and adjusting a duty ratio of the switching signal in response to the frequency of the switching signal being lower than the reference frequency.

The method may further include sensing a current flowing through the rectifier, wherein in the adjusting of the selected parameter, a number of the adjusted selected parameter is determined based on an average value of the current flowing through the rectifier.

The adjusting of the selected parameter may include: comparing a phase of AC power input to the rectifier and a phase of a current flowing through the rectifier to each other; and, based on a result of the comparison, adjusting a phase of the switching signal to synchronize the AC power and the current flowing through the rectifier with each other.

The sensing of the current may include sensing a reverse current flowing through the rectifier. The adjusting of the selected parameter may further include adjusting a fall point in time of the switching signal based on the reverse current.

The adjusting of the selected parameter may include adjusting a phase of the switching signal and a duty ratio of the switching signal, in response to the frequency of the switching signal being higher than a first reference frequency and lower than a second reference frequency.

The parameters may include a phase of the switching signal and a duty cycle of the switching signal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

The terminology used herein describes particular embodiments only, and this disclosure is not limited by such embodiments. As used herein, the singular forms "a," "an," and "the" are intended to include the plural forms as well, unless the context clearly indicates otherwise.

Figure 1:
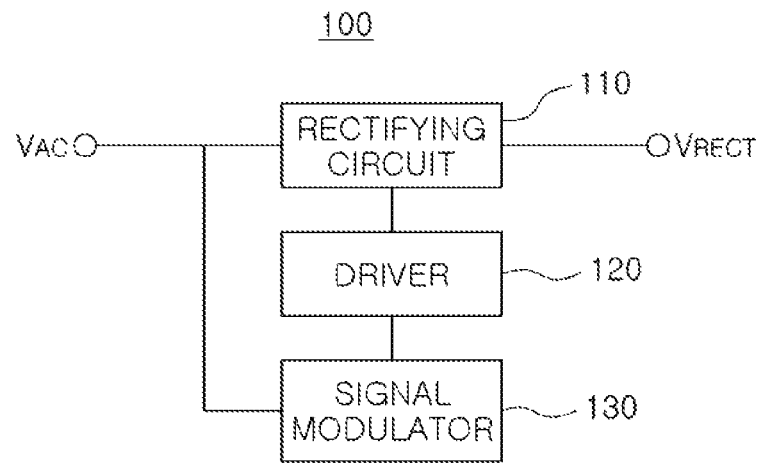
FIG. 1 is a view illustrating a rectifier, according to an embodiment.

FIG. 1 is a view illustrating a rectifier 100, according to an embodiment. Referring to FIG. 1, the rectifier 100 includes a rectifying circuit 110, a driver 120, and a signal modulator 130.

The rectifying circuit 110 rectifies alternating current (AC) power $V_{AC}$ into direct current (DC) power $V_{RECT}$ through a switching operation. For example, a frequency of the AC power $V_{AC}$ may be a low frequency in a band of several hundreds of kHz or a high frequency in a MHz band. That is, the rectifying circuit 110 may perform a rectifying operation on AC power having a wide input frequency range.

The driver 120 applies a switching signal to the rectifying circuit 110. For example, the switching signal may be a pulse signal having the same frequency as that of the AC power $V_{AC}$.

The signal modulator 130 selects at least one of a plurality of parameters of the switching signal based on a frequency of the switching signal, and adjusts the selected parameter with respect to the switching signal. The parameter may include a phase, a duty ratio, an amplitude, a waveform, or the like, of the switching signal. A signal adjusting device and an effect of the signal modulator 130 may be changed depending on the selection of the parameter.

For example, the signal modulator 130 selects a control mode based on the frequency of the switching signal to control the driver 120. For example, in a case in which the frequency of the switching signal is a high frequency, the signal modulator 130 may be operated in a first mode. For example, in a case in which the frequency of the switching signal is a low frequency, the signal modulator 130 may be operated in a second mode.

For example, when the signal modulator 130 is operated in the first mode, the signal modulator 130 controls synchronization between the AC power input of the rectifying circuit 110 and switching of the rectifying circuit 110. For example, when the signal modulator 130 is operated in the second mode, the signal modulator 130 senses a reverse current generated in the rectifying circuit 110 to control switching of the rectifying circuit 110.

In a case in which the AC power has a high frequency, a synchronization operation may provide a higher efficiency than an efficiency provided by a reverse current sensing operation. On the other hand, in a case in which the AC power has a low frequency, the reverse current sensing operation may provide a higher efficiency than an efficiency generated by the synchronization operation. Therefore, the rectifier 100 may perform a rectifying operation at high efficiency on AC power having a wide input frequency range.

Figure 2:
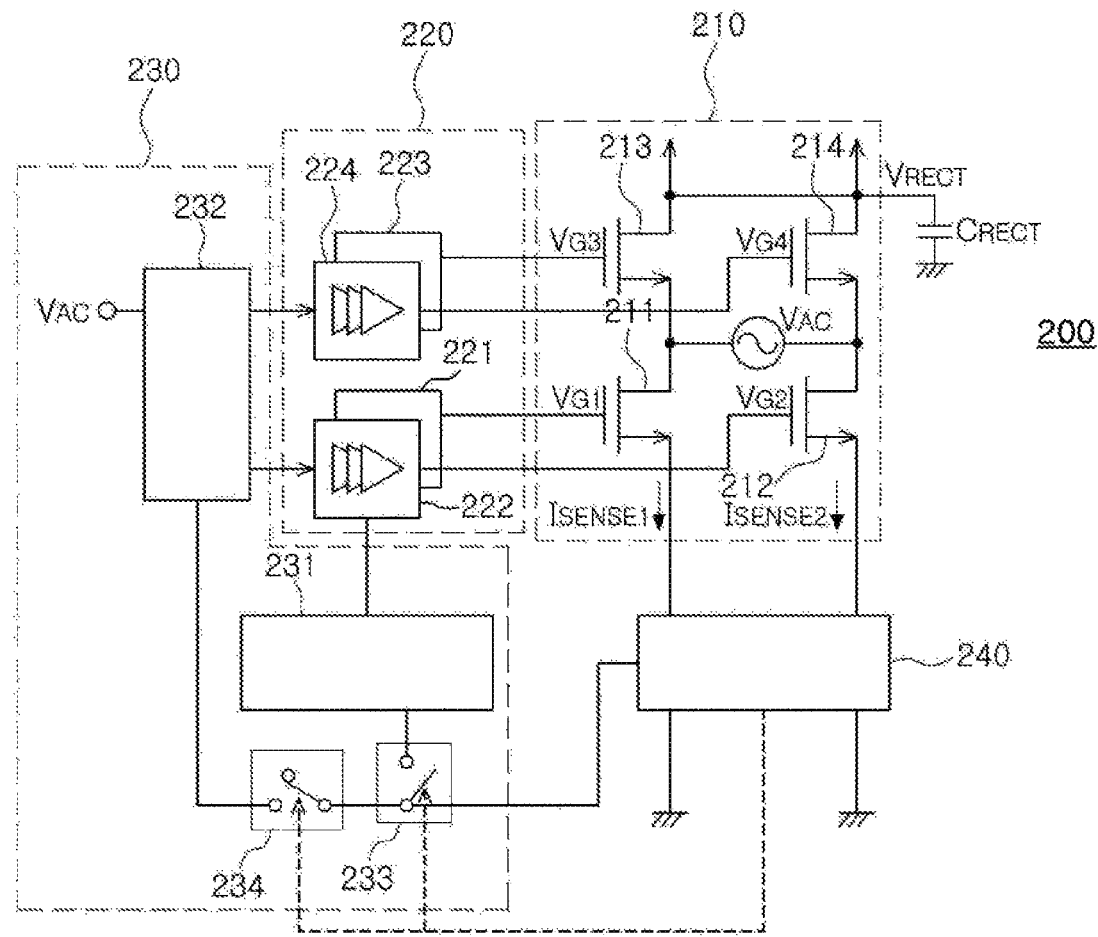
FIG. 2 is a view illustrating a rectifier in more detail, according to an embodiment.

FIG. 2 is a view illustrating a rectifier 200 in more detail, according to an embodiment. Referring to FIG. 2, the rectifier 200 includes a rectifying circuit 210, a driver 220, and a signal modulator 230. The rectifying circuit 210 includes first to fourth transistors 211 to 214. For example, the first to fourth transistors 211 to 214 may be implemented by an N-type lateral double diffused metal oxide semiconductor field effect transistor (LD-MOSFET).

The first and second transistors 211 and 212 may receive AC power through drain terminals thereof, and the third and fourth transistors 213 and 214 may receive AC power through source terminals thereof.

In addition, the first to fourth transistors 211 and 214 may receive first to fourth switching signals $V_{G1}$ to $V_{G4}$ through gate terminals thereof, respectively, to thereby be turned on or off. When values of the second and third switching signals $V_{G2}$ and $V_{G3}$ are high, values of the first and fourth switching signals $V_{G1}$ and $V_{G4}$ may be low, and when values of the second and third switching signals $V_{G2}$ and $V_{G3}$ are low, values of the first and fourth switching signals $V_{G1}$ and $V_{G4}$ may be high.

In addition, the first transistor 211 may be connected to the third transistor 213 in series, and the second transistor 212 may be connected to the fourth transistor 214 in series.

Therefore, the third and fourth transistors 213 and 214 may output DC power $V_{RECT}$ through drain terminals thereof.

Referring to FIG. 2, the driver 220 includes first to fourth gate drivers 221 to 224. The first to fourth gate drivers 221 to 224 generate the first to fourth switching signals $V_{G1}$ to $V_{G4}$ respectively, and transfer the first to fourth switching signals $V_{G1}$ to $V_{G4}$ to the first to fourth transistors 211 to 214, respectively.

Hereinafter, a rectifying operation of the rectifying circuit 210 and the driver 220 will be described in detail.

At the time of initial driving of the rectifying circuit 210, the DC power $V_{RECT}$ is not generated, and thus gate voltages may not be applied to the first to fourth transistors. In a case in which the gate voltages are not applied to the first to fourth transistors 211 to 214, and all of the first to fourth transistors 211 to 214 are therefore in a turn-off state, the first to fourth transistors 211 to 214 may be considered as a structure of a full-bridge diode by back-gate diodes of the first to fourth transistors 211 to 214 to perform a rectifying operation. In a case in which the first to fourth transistors 211 to 214 are operated by the back-gate diode, a drain voltage of the diode drops, and thus rectification efficiency may be low. After the DC power $V_{RECT}$ rises to a predetermined voltage or more by the full-bridge diode, the gate voltages may be applied to the first to fourth transistors.

When the gate voltages are applied to the first to fourth transistors, in a case in which a current of the AC power is a positive current, the second and third transistors 212 and 213 may be simultaneously turned on. In a case in which a current of the AC power is a negative current, the first and fourth transistors 211 and 214 may be simultaneously turned on.

In an example, the more precise the turn-on timing synchronized with a phase of the AC power, the higher the rectification efficiency of the rectifying circuit 210 will be. In a case in which the turn-on timing and the phase of the AC power are not synchronized with each other, a back-gate diode may appear in an output of the rectifying circuit 210 or electric charges charged by a capacitance $C_{RECT}$ of the rectifying circuit 210 may be discharged. This may negatively affect the rectification efficiency of the rectifying circuit 210. In order to allow the turn-on timing to be precisely synchronized with the phase of the AC power, the signal modulator 230 may adjust the switching signal.

Referring to FIG. 2, the rectifier 200 further includes a sensor 240, and the signal modulator 230 includes a duty ratio adjuster 231 and a phase adjuster 232.

The sensor 240 senses currents $I_{SENSE1}$ and $I_{SENSE2}$ flowing through the first to fourth transistors 211 to 214. For example, the sensor 240 senses a polarity of a current flowing through at least one of the first to fourth transistors 211 to 214 to sense whether or not a reverse current flows through at least one of the first to fourth transistors 211 to 214. The reverse current may negatively affect the rectification efficiency of the rectifying circuit 210.

The duty ratio adjuster 231 may adjust a duty ratio of at least one of the first to fourth switching signals $V_{G1}$ to $V_{G4}$. For example, the duty ratio adjuster 231 moves up a fall point in time of a value of the third switching signal $V_{G3}$ to control a duty ratio of the third switching signal $V_{G3}$. Therefore, a turn-on state duration of the third transistor 213 may be shortened as compared to that of the third transistor 213 before the third switching signal $V_{G3}$ is adjusted. Therefore, a reverse current generated in the third transistor 213 may be removed, whereby the rectification efficiency of the rectifying circuit 210 may be improved.

The phase adjuster 232 may adjust a phase of at least one of the first to fourth switching signals $V_{G1}$ to $V_{G4}$. For example, the phase adjuster 232 may compare a phase of the AC power and a phase of the third switching signal $V_{G3}$ with each other, and may adjust the phase of the third switching signal $V_{G3}$ so that the AC power and the third switching signal $V_{G3}$ are synchronized with each other on the basis of a comparison result. For example, the phase adjuster 232 may perform a synchronization operation using a delay locked loop. Therefore, rectification efficiency of the rectifying circuit 210 may be improved.

Meanwhile, the phase adjuster 232 may complement a circuit delay between sensing timing of the sensor 240 and blocking timing of the gate drivers 221 to 224 for the transistors. Therefore, the phase adjuster 232 may adjust at least one of the first to fourth switching signals $V_{G1}$ to $V_{G4}$ together with the duty ratio adjuster 231.

The improvement of the rectification efficiency of the rectifying circuit 210 by the adjustment of the signal modulator 230 may be changed depending on a frequency of the switching signal. In a case in which a frequency of the switching signal is lower than a first reference frequency, rectification efficiency of the rectifying circuit 210 provided by the adjustment of the duty ratio may be higher than the rectification efficiency of the rectifying circuit 210 provided by the adjustment of the phase. Therefore, the signal modulator 230 may operate the duty ratio adjuster 231 and the sensor 240 to improve rectification efficiency, and may stop the phase adjuster 232 to reduce power consumption. In a case in which a frequency of the switching signal is higher than a second reference frequency, rectification efficiency of the rectifying circuit 210 provided by the adjustment of the phase may be higher than the rectification efficiency of the rectifying circuit 210 provided by the adjustment of the duty ratio. Therefore, the signal modulator 230 may operate the phase adjuster 232 to improve rectification efficiency, and may stop the duty ratio adjuster 231 and the sensor 240 to reduce power consumption.

In a case in which a frequency of the switching signal is higher than the first reference frequency and is lower than the second reference frequency, rectification efficiency of the rectifying circuit 210 provided by the adjustment of the phase and rectification efficiency of the rectifying circuit 210 provided by the adjustment of the duty ratio may be similar to each other. Therefore, the signal modulator 230 may operate both the duty ratio adjuster 231 and the phase adjuster 232 to significantly improve rectification efficiency.

Therefore, a rectifier, such as the rectifier 200, secures high rectification efficiency with the AC power $V_{AC}$ having the wide input frequency range.

As a detailed example for enabling selection of the adjusting device of the signal modulator 230, the signal modulator 230 includes first and second switches 233 and 234. The first and second switches 233 and 234 may perform a branch operation based on the frequency of the switching signal between the sensor 240, the duty ratio adjuster 231, and the phase adjuster 232. That is, the adjusting device of the signal modulator 230 may be selected by the sensor 240 and may be implemented through the first and second switches 233 and 234.

For example, the second switch 234 is disposed between the sensor 240 and the phase adjuster 232, and is turned off in a case in which the frequency of the switching signal is lower than the first reference frequency and is turned on in a case in which the frequency of the switching signal is higher than the first reference frequency.

For example, the first switch 233 is disposed between the sensor 240 and the duty ratio adjuster 231, and is turned on in a case in which the frequency of the switching signal is lower than the second reference frequency and is turned off in a case in which the frequency of the switching signal is higher than the second reference frequency.

Here, the second reference frequency may be higher than the first reference frequency. Therefore, in a case in which the frequency of the switching signal is higher than the first reference frequency and is lower than the second reference frequency, both of the first and second switches 233 and 234 may be turned on.

The adjusting device of the signal modulator 230 may be one or more of the duty ratio adjuster 231, the phase adjuster 232 or the sensor 240.

For example, the phase adjuster 232 may receive the AC power $V_{AC}$ to determine the frequency of the switching signal, and may select adjusting device to determine whether or not the duty ratio adjuster 231 and the sensor 240 are operated.

Figure 3:
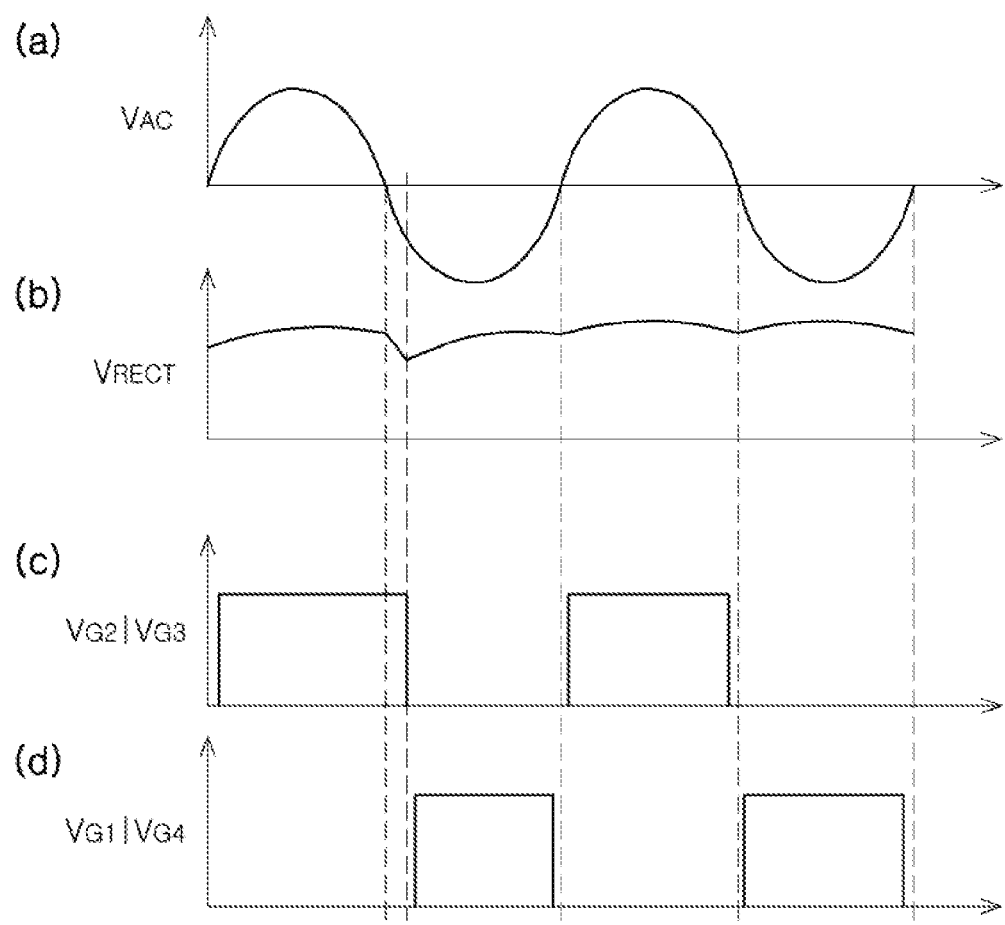
FIG. 3 includes graphs illustrating rectification efficiency of a rectifying circuit of FIG. 2, according to an embodiment.

FIG. 3 includes graphs illustrating rectification efficiency of a rectifying circuit of FIGS. 1 and 2 according to an embodiment. Referring to FIG. 3, a horizontal axis indicates a time, a vertical axis of a graph (a) of FIG. 3 indicates AC power $V_{AC}$, a vertical axis of a graph (b) of FIG. 3 indicates DC power $V_{RECT}$, a vertical axis of a graph (c) of FIG. 3 indicates second and third switching signals $V_{G2}$ and $V_{G3}$, and a vertical axis of a graph (d) of FIG. 3 indicates first and fourth switching signals $V_{G1}$ and $V_{G4}$.

It may be confirmed that when the second and third switching signals $V_{G2}$ and $V_{G3}$ are not optimized, and thus values of the second and third switching signals $V_{G2}$ and $V_{G3}$ are high even though a level of the AC power $V_{AC}$ is a negative level, the DC power $V_{RECT}$ is discharged, thereby causing a reduction in efficiency. In a case in which the first and fourth switching signals $V_{G1}$ and $V_{G4}$ are first turned off or turned on with respect to the AC power $V_{AC}$, electric charges charged in an output terminal of a rectifying circuit may be discharged as the AC power or may be discharged through the back-gate diode, thereby reducing rectification efficiency.

The rectifier according to the embodiments disclosed herein may suppress the reduction in the rectification efficiency described above.

Figure 4:
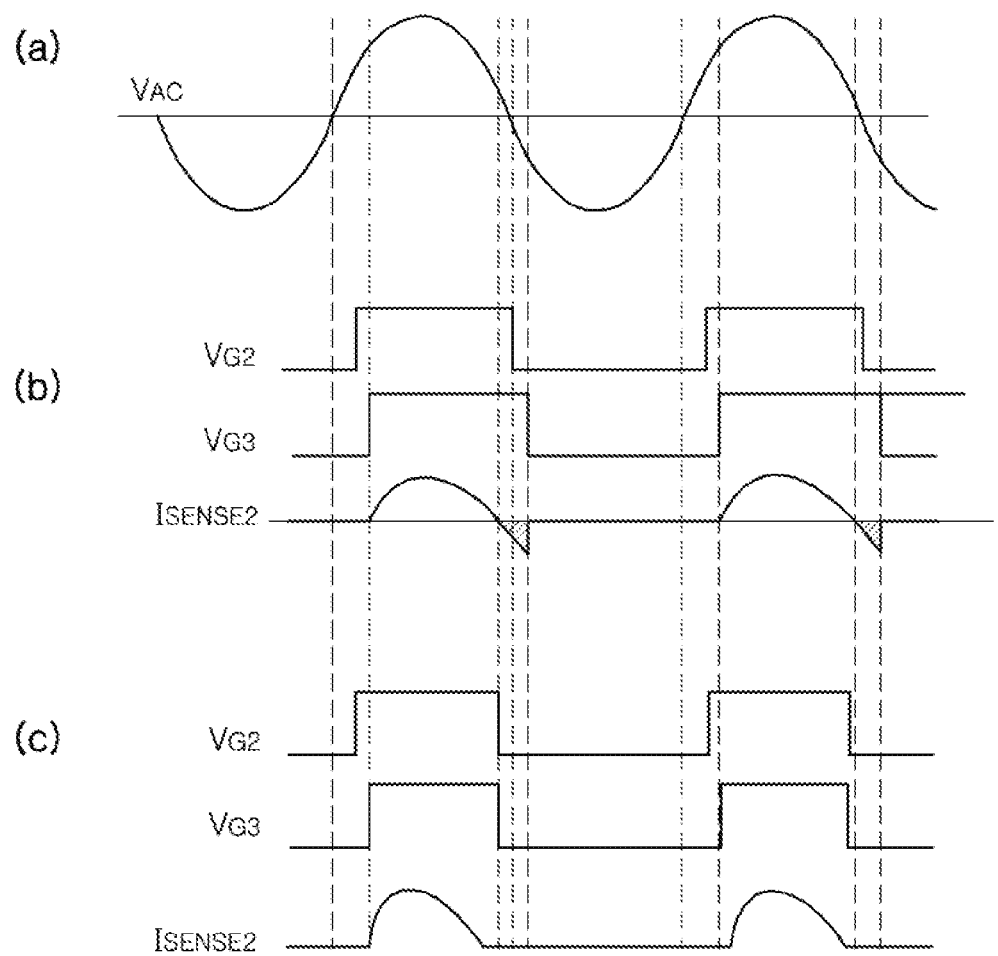
FIG. 4 includes graphs illustrating reverse current removal depending on an operation of a duty ratio adjuster of FIG. 2, according to an embodiment.

FIG. 4 includes graphs illustrating reverse current removal depending on an operation of a duty ratio adjuster of FIG. 2, according to an embodiment. Graph (a) of FIG. 4 illustrates AC power $V_{AC}$, graph (b) of FIG. 4 illustrates second and third switching signals $V_{G2}$ and $V_{G3}$ and a current $I_{SENSE2}$ of the second and third transistors 212 and 213 before the duty ratio adjuster 231 is operated, and graph (c) of FIG. 4 illustrates second and third switching signals $V_{G2}$ and $V_{G3}$ and a current $I_{SENSE2}$ of the second and third transistors 212 and 213 when the duty ratio adjuster 231 is operated.

Referring to graphs (a) and (b) of FIG. 4, even after a polarity of the AC power $V_{AC}$ is changed from a positive polarity to a negative polarity, sections in which values of the second and third switching signals $V_{G2}$ and $V_{G3}$ are high may be present. In these sections, a polarity of the current $I_{SENSE2}$ of the second and third transistors 212 and 213 may be changed from a positive polarity to a negative polarity. That is, a reverse current may be generated in the second and third transistors 212 and 213.

Referring to graphs (a) and (c) of FIG. 4, voltage drop points in time of the second and third switching signals $V_{G2}$ and $V_{G3}$ may be controlled so that values of the second and third switching signals $V_{G2}$ and $V_{G3}$ are changed from a high value to a low value as soon as the polarity of the AC power $V_{AC}$ is changed from the positive polarity to the negative polarity. That is, the generation of the reverse current in the second and third transistors may be prevented by operating the duty ratio adjuster 231. Therefore, rectification efficiency of the rectifier 200, according to the embodiment of FIG. 2, may be improved.

Figure 5:
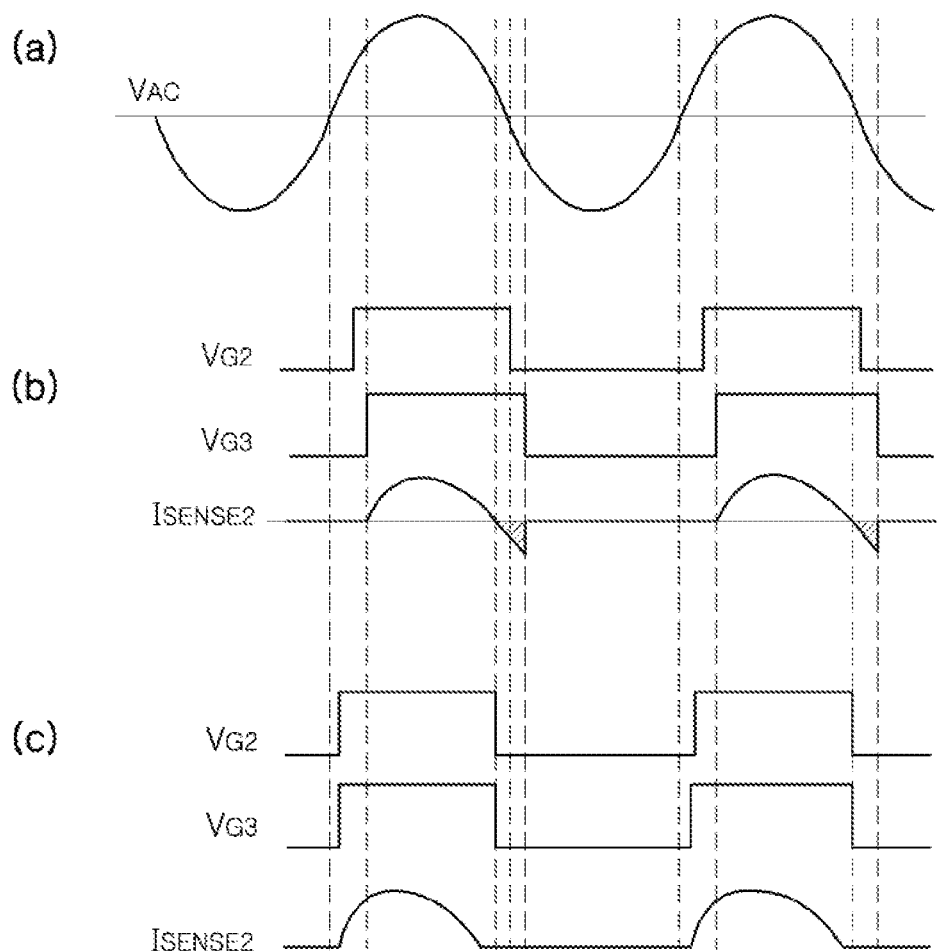
FIG. 5 includes graphs illustrating reverse current removal depending on an operation of a phase adjuster of FIG. 2, according to an embodiment.

FIG. 5 includes graphs illustrating reverse current removal depending on an operation of the phase adjuster of FIG. 2. Graph (a) of FIG. 5 illustrates AC power $V_{AC}$, graph (b) of FIG. 5 illustrates second and third switching signals $V_{G2}$ and $V_{G3}$ and a current $I_{SENSE2}$ of the second and third transistors 212 and 213 before the phase adjuster is operated, and graph (c) of FIG. 5 illustrates second and third switching signals $V_{G2}$ and $V_{G3}$ and a current $I_{SENSE2}$ of the second and third transistors 212 and 213 when the phase adjuster is operated.

Referring to graph (a) and (b) of FIG. 5, even after a polarity of the AC power $V_{AC}$ is changed from a positive polarity to a negative polarity, sections in which values of the second and third switching signals $V_{G2}$ and $V_{G3}$ are high may be present. In these sections, a polarity of the current $I_{SENSE2}$ of the second and third transistors 212 and 213 may be changed from a positive polarity to a negative polarity. That is, a reverse current may be generated in the second and third transistors 212 and 213.

Referring to graphs (a) and (c) of FIG. 5, phases of the second and third switching signals $V_{G2}$ and $V_{G3}$ may be adjusted so that values of the second and third switching signals $V_{G2}$ and $V_{G3}$ are changed from a high value to a low value as soon as the polarity of the AC power $V_{AC}$ is changed from the positive polarity to the negative polarity. That is, the generation of the reverse current in the second and third transistors may be prevented by operating the phase adjuster 232. Therefore, rectification efficiency of the rectifier 200 according to the embodiment of FIG. 2 may be improved.

Figure 6:
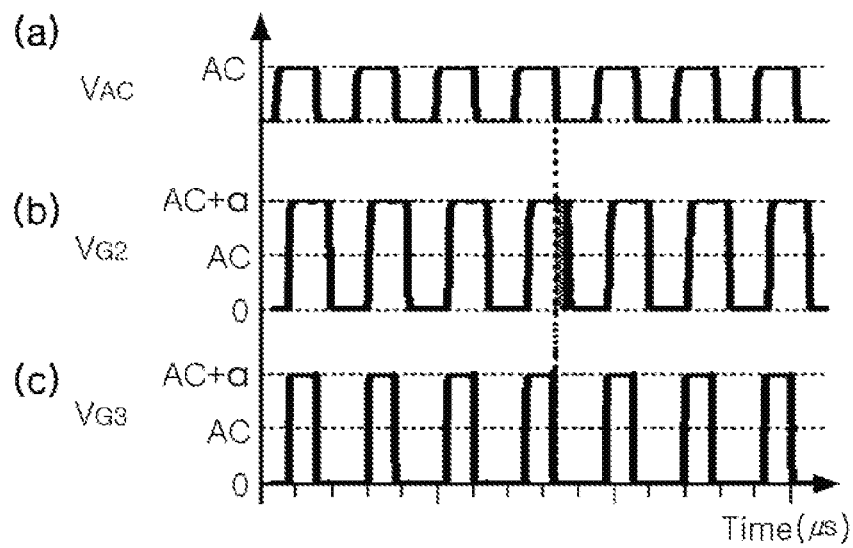
FIG. 6 includes graphs illustrating measured gate voltages of a rectifier, according to an embodiment.

FIG. 6 includes graphs illustrating measured gate voltages of a rectifier, according to an embodiment. Referring to FIG. 6, a horizontal axis indicates a time, a vertical axis of graph (a) indicates AC power $V_{AC}$, a vertical axis of graph (b) indicates a second switching signal $V_{G2}$ before adjustment of the signal modulator, and a vertical axis of graph (c) indicates a third switching signal $V_{G3}$ after adjustment of the signal modulator.

The rectifier according to the embodiment illustrated in FIG. 6 may synchronize switching timing of at least one transistor included in the rectifier with the AC power $V_{AC}$ using the signal modulator. Therefore, high rectification efficiency may be provided with respect to the AC power, which has a wide input frequency range.

Hereinafter, a method of controlling a rectifier, according to an embodiment, will be described. Since the method of controlling a rectifier may be performed in the rectifiers described above with reference to FIGS. 1 through 6, a description of contents that are the same as or correspond to the contents described above will be omitted in order to avoid an overlapping description.

Figure 7:
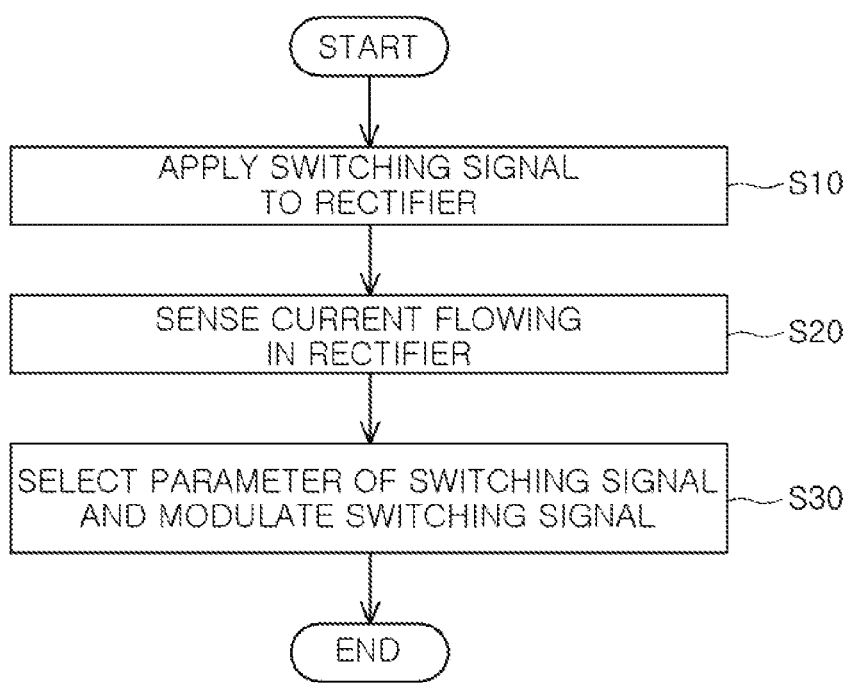
FIG. 7 is a flow chart illustrating a method of controlling a rectifier, according to an embodiment.

FIG. 7 is a flow chart illustrating a method of controlling a rectifier, according to an embodiment. Referring to FIG. 7, the rectifier applies a switching signal to the rectifier in operation S10, senses a current flowing through the rectifier in operation S20, and selects a parameter of the switching signal to adjust the switching signal in operation S30.

For example, the method of controlling the rectifier may be performed in the rectifier itself through an internal control circuit of the rectifier, or may be performed by an external control circuit. The method of controlling a rectifier may also be applied to modules (an alliance for wireless power (A4WP), a wireless power consortium (WPC), and a power matters alliance (PMA)) for wireless power transmission (WPT) or wireless communications performing a rectifying operation.

According to the example method described above, the rectifier and a module including the rectifier may provide high rectification efficiency with respect to AC power having a wide input frequency range.

Figure 8:
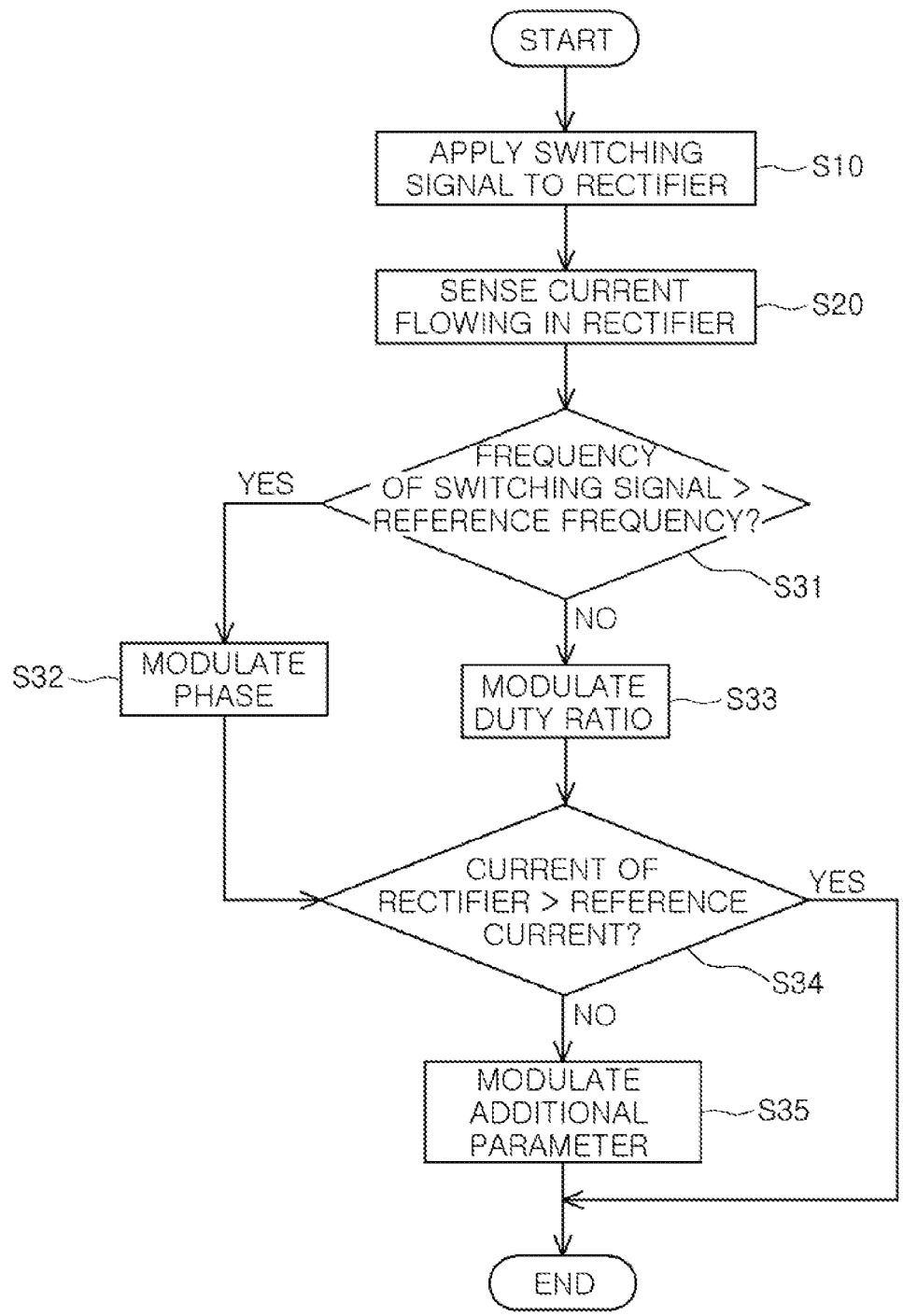
FIG. 8 is a flow chart illustrating in detail a method of controlling a rectifier, according to an embodiment.

FIG. 8 is a flow chart illustrating in detail a method of controlling a rectifier, according to an embodiment. Referring to FIG. 8, the rectifier applies a switching signal to the rectifier in operation S10, senses a current flowing through the rectifier in operation S20, and compares a frequency of the switching signal with a reference frequency in operation S31. In response to the frequency of the switching signal being higher than a reference frequency, the rectifier adjusts a phase of the switching signal in operation S32. Alternatively, in response to the frequency of the switching signal being lower than the reference frequency, the rectifier adjusts a duty ratio of the switching signal in operation S33. Following operation S32 or S33, the rectifier compares a current of the rectifier to a reference current in operation S3, and then, in response to the current of the rectifier being smaller than the reference current, adjusts an additional parameter of the switching signal in operation S35.

A detailed computing process of the method illustrated in FIGS. 7 and 8 will be described with reference to FIG. 9. For example, an input device receives an output of the sensor and a memory stores a reference frequency, a reference current, and the like, therein. A processor may compare an input value of the input device with a value stored in the memory to calculate an adjustment value of the switching frequency. An output device may output a signal for controlling the driver.

Figure 9:
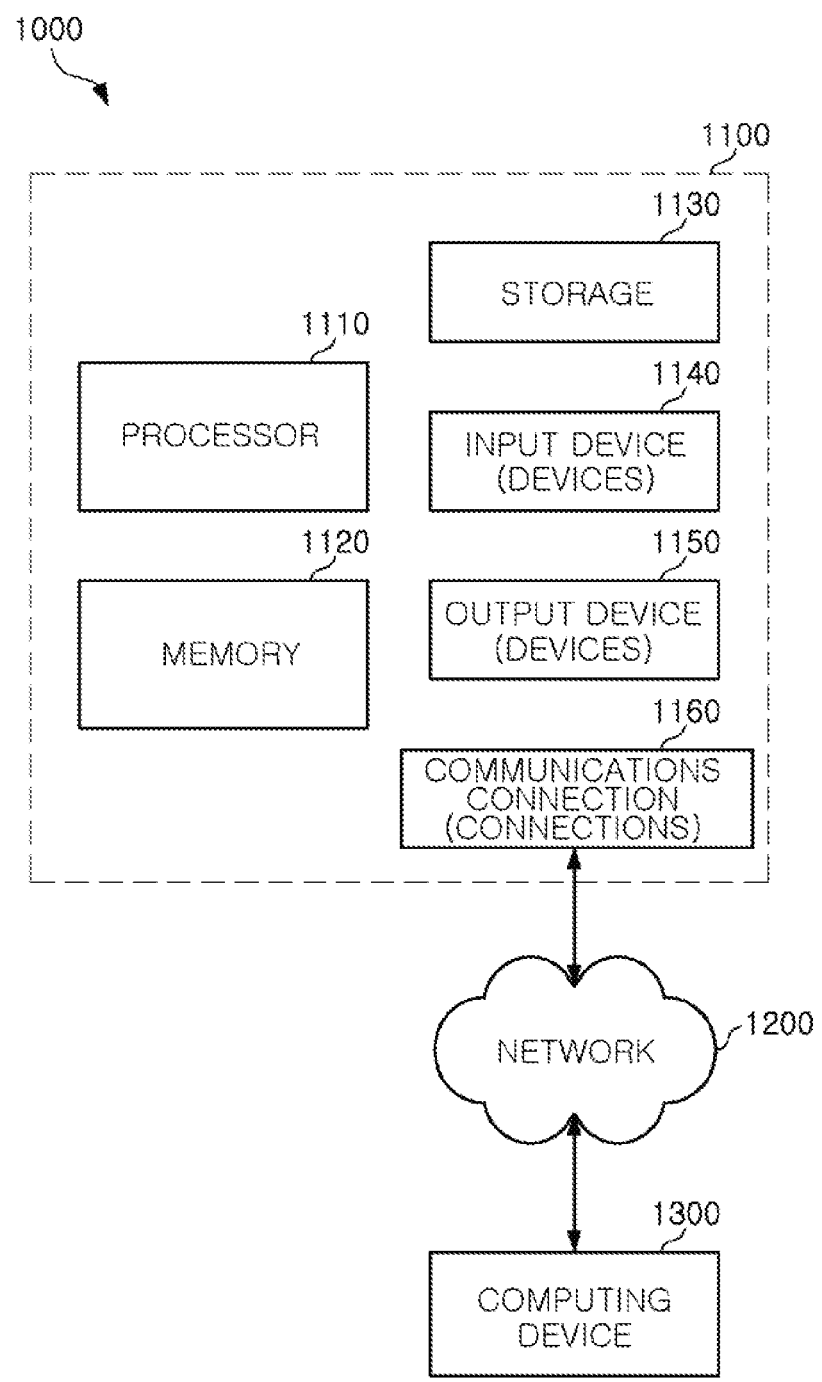
FIG. 9 is a view illustrating a computing environment in which the methods of controlling a rectifier of FIGS. 7 and 8 may be implemented, according to an embodiment.

FIG. 9 is a view illustrating an example computing environment in which methods of controlling a rectifier, such as the methods of FIGS. 7 and 8, may be implemented. In FIG. 9, an example of a system 1000 including a computing device 1100 implementing one or more of the above-mentioned embodiments is illustrated. For example, the computing device 1100 may include a personal computer, a server computer, a handheld or laptop device, a mobile device (a mobile phone, a personal digital assistants (PDA), a media player, or the like), a multiprocessor system, a consumer electronic device, a mini computer, a mainframe computer, a distributed computing environment including any system or device described above, or the like, but is not limited thereto.

The computing device 1100 may include at least one processor 1110 and a memory 1120. The processor 1110 may include, for example, a central processing unit (CPU), a graphics processing unit (GPU), a microprocessor, an application specific integrated circuit (ASIC), a field programmable gate array (FPGA), or the like, and may have multiple cores. The memory 1120 may be a volatile memory (for example, a random access memory (RAM), or the like), a non-volatile memory (for example, a read only memory (ROM), a flash memory, or the like), or a combination thereof.

In addition, the computing device 1100 may further include a storage 1130. The storage 1130 may include a magnetic storage, an optical storage, or the like, but is not limited thereto. Computer-readable commands for implementing one or more embodiments disclosed herein may be stored in the storage 1130, and other computer-readable commands for implementing an operating system, an application program, and the like, may also be stored in the storage 1130. The computer-readable commands stored in the storage 1130 may be loaded into the memory 1120 in order to be executed by the processor 1110.

In addition, the computing device 1100 may include one or more input devices 1140 and one or more output devices 1150. The input device(s) 1140 may include, for example, a keyboard, a mouse, a pen, an audio input device, a touch input device, an infrared camera, a video input device, any other input device, or the like. In addition, the output device(s) 1150 may include, for example, one or more displays, speakers, printers, any other output devices, or the like. In addition, in the computing device 1100, an input device or an output device included in another computing device may be used as the input device(s) 1140 or the output device(s) 1150.

In addition, the computing device 1100 may include one or more communications accesses 1160 so that the computing device 1100 may communicate with another device (for example, another computing device 1300) through a network 1200. Here, the communications access(es) 1160 may include a modem, a network interface card (NIC), an integrated network interface, a radio frequency transmitter/receiver, an infrared port, a universal serial bus (USB) access, or another interface for connecting the computing device 1100 to another computing device. In addition, the communications access(es) 1160 may include a wired connection or a wireless connection.

The respective components of the computing device 1100 described above may be interconnected through various interconnections (for example, a peripheral component interconnect (PCI), a USB, a firmware (IEEE 1394), an optical bus structure, and the like) such as a bus, and the like, or may be interconnected by a network.

As set forth above, according to an embodiment in the present disclosure, a rectifier may provide high rectification efficiency with the AC power having the wide input frequency range.

The apparatuses, units, modules, devices, and other components (e.g., the rectifying circuit 110, driver 120, signal modulator 130, sensor 240, processor 1110, memory 1120 and storage 1130) illustrated in FIGS. 1, 2 and 9 that perform the operations described herein with respect to FIGS. 3-8 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 3-8. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 7 and 8 that perform the operations described herein with respect to FIGS. 3-6 are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A rectifier, comprising:
   a rectifying circuit configured to rectify alternating current (AC) power into direct current (DC) power through a switching operation;
   a driver configured to apply a switching signal to the rectifying circuit; and
   a signal modulator configured to:
   compare a frequency of the switching signal to a first reference frequency,
   select a parameter from among parameters of the switching signal based on the comparison, and
   adjust the selected parameter.

2. A rectifier, comprising:
   a rectifying circuit configured to rectify alternating current (AC) power into direct current (DC) power through a switching operation;
   a driver configured to apply a switching signal to the rectifying circuit; and
   a signal modulator configured to select a parameter from among parameters of the switching signal based on a frequency of the switching signal, and adjust the selected parameter,
   wherein:
   in response to the frequency of the switching signal being higher than the first reference frequency, the selected parameter comprises a phase of the switching signal; or
   in response to the frequency of the switching signal being lower than the first reference frequency, the selected parameter comprises a duty ratio of the switching signal.

3. The rectifier of claim 2, wherein in response to the frequency of the switching signal being higher than the first reference frequency and lower than a second reference frequency, the selected parameter comprises the phase of the switching signal and the duty ratio of the switching signal.

4. The rectifier of claim 1, further comprising:
a sensor configured to sense a current flowing through the rectifying circuit, wherein the signal modulator is further configured to adjust at least one of a phase or a duty ratio of the switching signal based on the current flowing through the rectifying circuit.

5. The rectifier of claim 4, wherein the signal modulator comprises:
a phase adjuster configured to adjust the phase of the switching signal;
a duty ratio adjuster configured to adjust the duty ratio of the switching signal based on a sensing result of the sensor; and
switches configured to perform a branch operation based on a frequency of the switching signal between the sensor, the phase adjuster, and the duty ratio adjuster.

6. The rectifier of claim 5, wherein the phase adjuster is configured to compare a phase of the AC power and the phase of the switching signal to each other, and adjust the phase of the switching signal, based on a result of the comparison, to synchronize the AC power and the switching signal with each other.

7. The rectifier of claim 1, wherein:
the rectifying circuit comprises
first and second transistors configured to receive the AC power through drain terminals of first and second transistors, and receive the switching signal through gate terminals of the first and second transistors, and
third and fourth transistors configured to receive the AC power through source terminals of the third and fourth transistors, and receive the switching signal through gate terminals of the third and fourth transistors;
the first transistor is connected to the third transistor in series; and
the second transistor is connected to the fourth transistor in series.

8. The rectifier of claim 7, further comprising:
a sensor configured to sense a reverse current flowing through the first and second transistors, wherein the signal modulator is configured to control a fall point in time of the switching signal applied to the first and second transistors based on the reverse current.

9. A method of controlling a rectifier, comprising:
applying a switching signal to the rectifier;
comparing the switching signal to a first reference frequency;
selecting a parameter from among parameters of the switching signal based the comparing; and
adjusting the selected parameter with respect to the switching signal.

10. The method of claim 9, wherein the adjusting of the selected parameter comprises one of:
adjusting a phase of the switching signal in response to the frequency of the switching signal being higher than the first reference frequency; and
adjusting a duty ratio of the switching signal in response to the frequency of the switching signal being lower than the reference frequency.

11. The method of claim 9, further comprising:
sensing a current flowing through the rectifier, wherein in the adjusting of the selected parameter, a number of the adjusted selected parameter is determined based on an average value of the current flowing through the rectifier.

12. The method of claim 9, wherein the adjusting of the selected parameter comprises:
comparing a phase of AC power input to the rectifier and a phase of a current flowing through the rectifier to each other; and
based on a result of the comparison, adjusting a phase of the switching signal to synchronize the AC power and the current flowing through the rectifier with each other.

13. The method of claim 11, wherein:
the sensing of the current comprises sensing a reverse current flowing through the rectifier; and
the adjusting of the selected parameter further comprises adjusting a fall point in time of the switching signal based on the reverse current.

14. The method of claim 9, wherein the adjusting of the selected parameter comprises adjusting a phase of the switching signal and a duty ratio of the switching signal, in response to the frequency of the switching signal being higher than the first reference frequency and lower than a second reference frequency.

15. The method of claim 9, wherein the parameters comprise a phase of the switching signal and a duty cycle of the switching signal.

16. The rectifier of claim 1, wherein:
in response to the frequency of the switching signal being higher than the first reference frequency, the selected parameter comprises a phase of the switching signal; or
in response to the frequency of the switching signal being lower than the first reference frequency, the selected parameter comprises a duty ratio of the switching signal.

17. The rectifier of claim 16, wherein in response to the frequency of the switching signal being higher than the first reference frequency and lower than a second reference frequency, the selected parameter comprises the phase of the switching signal and the duty ratio of the switching signal.

* * * * *